Jan. 26, 1937.                G. SLIDER                2,068,773
                          OVERRUNNING CLUTCH
                          Filed Feb. 16, 1933

INVENTOR.
GEORGE SLIDER.
BY
           ATTORNEYS.

Patented Jan. 26, 1937

2,068,773

UNITED STATES PATENT OFFICE 2,068,773

OVER-RUNNING CLUTCH

George Slider, Detroit, Mich., assignor to Chrysler Corporation, Detroit, Mich., a corporation of Delaware Application February 16, 1933, Serial No. 657,048

6 Claims. (Cl. 192—45)

This invention relates to an improved over-running clutch and particularly to a device of this character for establishing a one-way drive between driving and driven parts of a vehicle propelling apparatus.

More specifically, my invention relates to improvements in over-running clutches of the type in which wedging of rolling contact or other clutch elements between registering surfaces of driving and driven members is relied upon to establish a one-way drive between such members.

The rollers or other clutch elements of over-running clutches of this kind have been confined in somewhat tapering spaces between the driving and driven parts of the devices and yieldably urged toward the constricted ends of such spaces by energizing springs or other resilient means. The resilient means urge the rollers toward a wedging relation between the relatively rotatable driving and driven parts so as to maintain unitary rotation between these parts so long as the speed of the normally driven part does not exceed that of the normal driving part. When this latter condition occurs, the normally driven part operates directly upon the rollers and urges them, against the action of the resilient means, toward the non-restricted ends of the spaces in which they are confined. Continuous contact between the rollers and driven part is required to retain the rollers in their inoperative positions and as a result they are spun at a relatively high rate of speed during over-running of the driven member relative to the driving member. The spinning of the rollers causes a disagreeable buzzing noise and a much more objectionable scoring and grooving of the driving member. In most instances, this spinning action results in the wearing of deep grooves in the driving part which delays the movement of the rollers to their wedging positions when the driven member ceases to over-run the driving member and causes excessive slipping as the driving member commences to propel the driven member.

When the structure of the over-running clutch is such that contact is required between the over-running parts thereof and the rollers in order to hold the latter in inoperative positions, slight eccentricities of the parts of the device cause first one and then another roller to be pinched between the driving and driven parts during the over-running action. This pinching of the rollers increases the buzzing noise and scoring of the driving member.

The energizing springs of an over-running clutch of the above type are necessarily conditioned to exert a substantial pressure upon the rollers for the contacting areas of the over-running part and rollers are not large enough to produce a sufficient self-energizing effect to promptly return the rollers to their operative positions when the speeds of the driving and driven members are again synchronized. Relatively strong springs of this kind cause the rollers to exert a substantial pressure upon the over-running part which materially increases spinning of the rollers and scoring of the driving member.

One of the main objects of this invention is to provide an over-running clutch unit of the roller clutch element type in which contact between the over-running part and rollers is not relied upon to hold the rollers in their inoperative positions.

Other objects of the invention are to provide means in an over-running clutch unit of this character which coact with the over-running part of the clutch independently of the roller clutch elements thereof and hold the latter in inoperative positions during over-running of the normally driven part relative to the normal driving part; to provide a clearance between the over-running part of the device and the rollers when the latter are in their inoperative positions so as to eliminate spinning of the rollers and the resulting noise and scoring of the parts of the device during over-running or free wheeling operations; to provide a cage or retainer for holding the rollers in spaced relation, which is adapted to permit the rollers to move away from the surfaces of the over-running part with which they normally contact during driving; to provide a roller retaining ring of this character which has a substantial surface disposed in close proximity to a surface of the over-running part and subjected to a dragging action by the lubricant on the latter surface which serves to move the retainer relative to the driving member in such a manner as to bring the rollers to their inoperative positions when the rotative speed of the driven part of the device exceeds that of the driving part thereof; to provide a device of this kind in which the drag applied upon the roller retaining means may be relied upon to supply the main portion of the energizing action required to return the rollers to their operative position when the driven member ceases to over-run the driving member, so as to permit the use of a comparatively weak energizing spring; and to provide an over-running clutch of improved construction in which slight eccentricity of the relatively rotatable parts may be tolerated.

An illustrative embodiment of the invention is shown in the accompanying drawing, in which.

Figure 1:
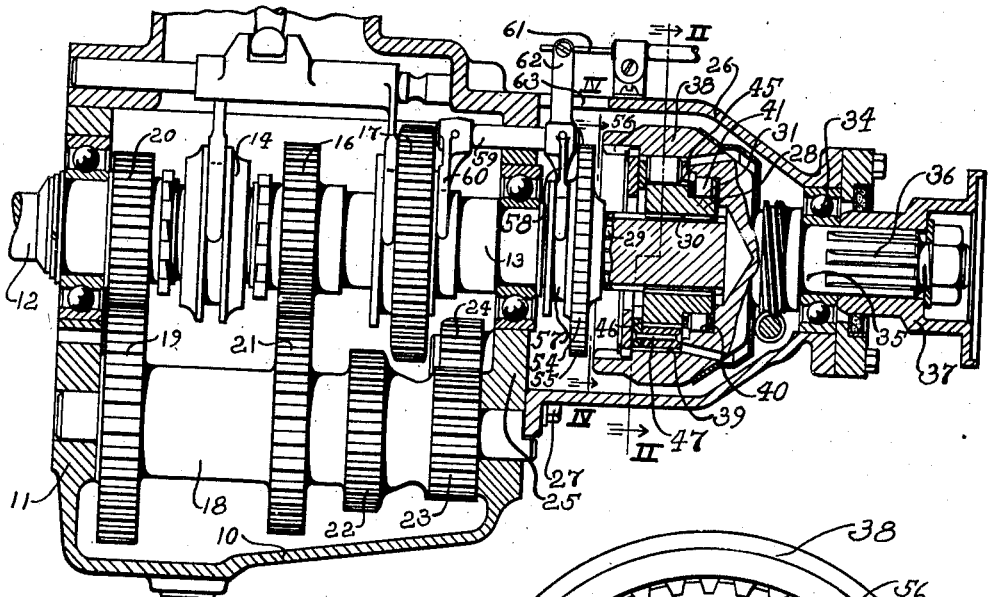
Fig. 1 is a longitudinal sectional view of a vehicle transmission which is equipped with an over-running clutch that employs my invention.
Figure 4:
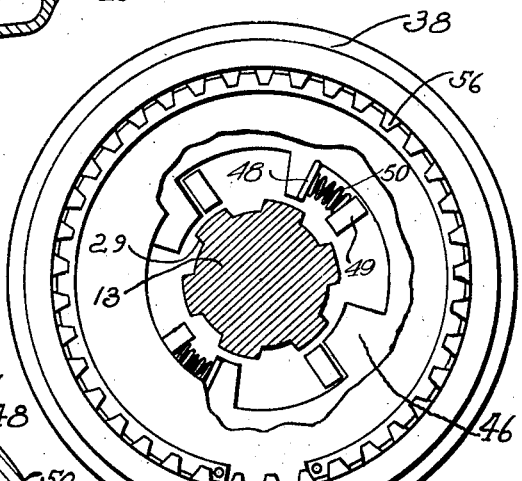
Fig. 4 is a transverse sectional view taken on the line IV—IV of Fig. 1, showing parts of the device broken away to disclose the underlying structure.

In the form shown, the improved free wheeling unit and portions of its control apparatus are illustrated in combination with a vehicle transmission of substantially conventional form which includes a housing 10 having a front end wall 11 in which is journaled a driven shaft 12 of a clutch (not shown). An intermediate transmission shaft 13 is mounted in the housing 10 substantially in alignment with the shaft 12 and provided with positive clutch mechanism 14 by which it may be directly connected with the shaft 12. The intermediate transmission shaft 13 is also provided with a fixed gear 16 and a shiftable gear 17. Rotatably mounted in the housing 10 below the aligned shafts 12 and 13 is a countershaft 18 having a gear 19 permanently meshed with the pinion 20 on the shaft 12 and a gear 21 permanently meshed with the gear 16 on the shaft 13. The countershaft 18 is also provided with a low speed pinion 22 with which the shiftable gear 17 is adapted to mesh when it is moved to the left, as viewed in Fig. 1, and it has a pinion 23 on its right extremity which is permanently meshed with a reverse pinion 24 that is adapted to mesh with the shiftable gear 17 when the latter is moved to the right, as viewed in Fig. 1.

The transmission shaft 13 extends outwardly beyond the rear wall 25 of the transmission housing 10 and is received in a casing 26 which is secured to the transmission housing by bolts 27 or other suitable means. Mounted on the right end portion of the shaft 13 is a cam 28 which, in the form shown, constitutes the driving member of the free wheeling unit. The shaft 13 and cam 28 are provided with splines 29 and 30, respectively, which secure the cam against rotation relative to the shaft 13. Formed on the right end portion of the cam 28 is a cylindrical peripheral portion 31 which is substantially concentric with the axis of the shaft 13. The remaining external portion of the periphery of the cam is provided with alternate cam surfaces 32 and relieved portions or depressions 33, best shown in Figs. 2 and 3.

The casing 26 of the free wheeling unit is provided with a bearing 34 in which a final driven shaft 35 is journaled. The shaft 35 has a splined external end portion 36 on which is mounted a coupling member 37 for operatively connecting it with a propeller shaft of a vehicle or other mechanism to be driven. A hollow drum 38, integrally formed on the opposite end of the shaft 35, is provided with substantially concentric cylindrical bores 39 and 40 within which the cam member 28 is received. A series of rolling contact elements 41 is disposed between the cylindrical bearing portion 31 of the cam and the wall of the cylindrical bore 40 of the drum 38 which register with each other. These bearing elements rotatably support the drum 38 on the cam 28 and maintain the bores of the drum in concentric relation with the axis of the shaft 13. The wall of the bore 39 of the hollow drum 38 registers with the portion of the cam 28 on which the cam surfaces 32 are formed.

A retaining ring 42, disposed between the wall of the bore 39 and the cam surfaces of the driving member of the unit, is provided with spaced chambers 43 having radially opposite open sides which are registerable with the relieved portions 33 of the cam member 28 and a roller 44 is disposed in each of the chambers 43 of the retaining ring. The rollers 44 are slightly larger in diameter than the radial thickness of the ring and they are adapted to protrude through the opposite open sides of their respective chambers. The chambers are, however, large enough to permit substantially free limited movement of the rollers inwardly with respect to the axis of the cam member when their inner open sides register with the recesses 33. The right ends of the chambers 43 are closed by end walls 45 formed integral with the body portion of the retainer and the left ends of the chambers are closed by a disc-shaped plate 46 which is secured to the left side of the retainer by rivets 47 or other suitable means, as illustrated in Fig. 1. The plate 46 of the retainer 42 abuts against the left extremity of the cam member 28 and it is provided with outwardly extending lugs 48 which register with lugs 49 carried by the cam member and between which coil springs 50 are disposed. The coil springs 50 yieldably urge the retainer and the rollers 44 carried thereby in a counter-clockwise direction relative to the cam. Lugs 51, which are also carried by the cam 28, extend into slots 52 formed in the portion of the plate 46 which overhangs the cam member. The lugs 51 are adapted to engage the extremities of the slots 52 so as to limit movement of the retainer relative to the cam in respectively opposite directions.

Figure 2:
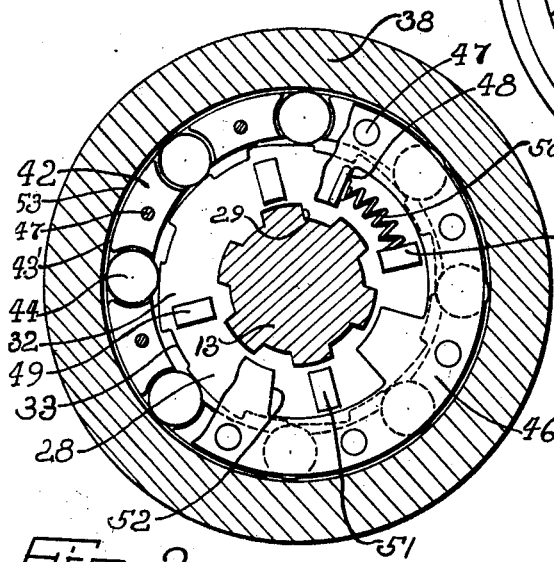
Fig. 2 is a transverse sectional view taken on the line II—II of Fig. 1 and showing the rollers in their operative positions.
Figure 3:
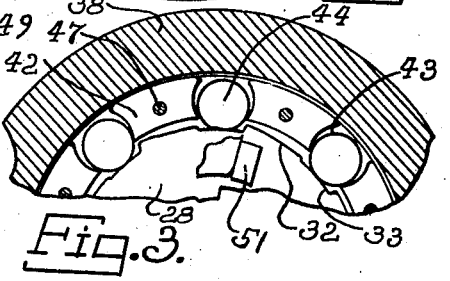
Fig. 3 is a fragmentary sectional view, similar to Fig. 2, but showing the rollers in their inoperative or over-running positions.

During driving operation, the cam 28 of the free wheeling unit is rotated by the shaft 13 in a clockwise direction, as viewed in Fig. 2, and the rollers 44 are wedged between the outermost portions of the cam surfaces 32 and the wall of the bore 39 of the drum 38, thereby providing a positive one-way driving connection between the driving and driven parts of the over-running clutch. When the rotative speed of the drum exceeds the rotative speed of the cam, the retainer 42 is rotated in a clockwise direction relative to the cam under the influence of the drag exerted upon the periphery of the retainer by the inner wall of the bore 39 of the drum and lubricant it carries. The peripheral portions 43' of the retainer are preferably located in close proximity to the wall of the bore 39 in order to assure the application of sufficient force upon the retainer to turn the latter in a clockwise direction against the action of the springs 50. Over-running of the drum relative to the cam member of the unit causes the retainer to be moved in a clockwise direction relative to the cam until the inner open sides of the chambers 43 register with the recesses or relieved portions 33 of the cam. When this condition exists, the rollers 44 drop into the recesses 33, as illustrated in Fig. 3, and they no longer contact with the wall of the bore 39. The clockwise drag applied upon the retainer by over-running of the driven member or drum of the device holds the rollers in their inoperative position without requiring contact between the wall of the bore of the drum and the rollers, and therefore the rollers are not caused to spin about their axes at a high rate of speed. The clearance 53 between the rollers and the bore of the wall of the drum is sufficient to prevent pinching of the rollers during the over-running action, even though slight eccentricity exists between the cam and the drum. Engagement between the lugs 51 and the extremities of the slots 52 toward which they are urged during movement of the rollers to their inoperative positions prevents the rollers from being moved into engagement with the high portions of the next adjacent cam surfaces during the over-running action.

As the rotative speeds of the driving and driven members of the over-running clutch become synchronized, the drum 38 exerts a counter-clockwise drag upon the retainer 42 which causes the latter to turn counter-clockwise relative to the cam and to move the rollers out of the relieved portions or recesses 33 of the cam toward their respective cam surfaces 32. This self-energizing drag may be relied upon to produce the main portion of the required movement of the retainer relative to the cam and the springs 50 need be conditioned to exert only that slight force which is required to promptly cause the rollers to move to the high portions of the cam surfaces 32 after the rotative speeds of the drum 38 and cam 28 have become synchronized. Engagement between the lugs 51 and the opposite ends of the slots 52 eliminates all danger of excessive wedging of the rollers 44 between the wall of the bore and the cam surfaces, and such engagement of these members will also prevent the rollers from riding over their cam surfaces and falling into the next adjacent recess.

The driving and driven members of the over-running clutch may be manually coupled together in a positive manner so as to produce a two-way drive when desired and they may be automatically coupled together so as to produce a two-way drive during a reverse driving of the vehicle. This is accomplished with the aid of a shiftable clutch member 54 having external clutch teeth 55 that are adapted to mesh with internal clutch teeth 56 formed on the drum 38 of the over-running clutch unit. The clutch element 54 is splined on the left end portion of the shaft 13 and provided with a grooved hub portion 57 in which a fork 58 is received. The fork 58 is mounted on one end portion of a shiftable bar 59 which is provided at its opposite end with a second fork 60 that is disposed adjacent the right side of the shiftable gear 17 of the transmission. When the gear 17 is moved to the right, as viewed in Fig. 1, to establish a reverse drive setting of the transmission gears it abuts against the fork 60 and causes the bar 59 and fork 58 thereon to be moved to the right. The fork 58 moves the clutch element 54 into engagement with the internal teeth 56 of the drum 38, thereby positively connecting the shaft 13 and drum 38 together. The bar 59 may be manually shifted to the right, as viewed in Fig. 1, by a cable 61, or other suitable means, which is attached to a lug 62 fixed on the bar 59 and extending through a slot 63 on the casing 26.

Although but one specific embodiment of my invention is herein shown and described, it will be understood that various changes in the size, shape and arrangement of parts may be made without departing from the spirit of my invention, and it is not my intention to limit its scope other than by the terms of the appended claims.

What I claim is:

1. An over-running clutch including a driven member having a cylindrical bore, a driving member having a cam disposed in said bore, means between the periphery of said cam and the wall of said bore for establishing a one-way driving connection between said driving and driven members including a plurality of rolling contact elements and a retaining ring for holding said elements in a predetermined spaced relation, the periphery of said cam having spaced relieved portions registerable with said rolling contact elements for accommodating movement thereof into non-contacting relation with said driven member during over-running of the latter relative to said driving member, the wall of said bore being lubricated and disposed in close proximity to peripheral portions of said retaining ring so as to exert a drag thereon for moving said rolling contact elements toward their operative positions when the speed of the driven member does not exceed that of the driving member and to move said rolling contact elements to their inoperative positions when the speed of said driven member exceeds that of the driving member, and resilient means bearing between said retaining ring and said driving member for urging said rolling contact elements toward their operative positions after the rotative speeds of said members have become synchronized.

2. An over-running clutch including a driven member having a cylindrical bore, a driving member having a cam disposed in said bore provided with alternate cam surfaces and relieved peripheral portions, a retaining ring between said cam and the wall of said bore provided with spaced chambers having open opposite sides registerable with the relieved portions of said cam respectively, a roller in each of said chambers adapted to extend through the open sides thereof and wedge between said cam surfaces and the wall of said bore for establishing a one-way drive between said members, said rollers having a substantially loose fit in said chambers and being partially movable through the inner open sides thereof into the relieved portions of said cam when said open sides register with said relieved portions during over-running of said driven member relative to said driving member, resilient means bearing between said ring and said driving member for simultaneously urging said rollers toward their wedging positions between said cam surfaces and the wall of said bore, and means acting on said retaining ring for limiting movement of said rollers in one direction from said peripheral portions.

3. In a device of the class described, a clutch including a driving shaft, a plurality of rollers and an inner race provided with depressions to receive said rollers, a series of cam surfaces on said inner race, said cam surfaces corresponding in number to the number of depressions, means responsive to deceleration of said driving shaft to shift said rollers from said surfaces into said depressions, resilient means normally opposing such shift, and means positively limiting movement of said rollers in one direction from said depression.

4. In a device of the class described, a clutch including a driving shaft, a plurality of rollers, a driven element adapted to coact therewith, and an inner race provided with depressions to receive said rollers, a series of cam surfaces on said inner race, said cam surfaces corresponding in number to the number of depressions, means responsive to deceleration of said driving shaft to shift said rollers from said surfaces into said depressions, said means including a cage surrounding said inner race for maintaining the angular spacing of said rollers, and means for limiting movement of said cage.

5. An overrunning clutch including a driven member having a cylindrical bore, a driving member having a cam disposed in said bore provided with alternate cam surfaces and relieved peripheral portions, a retaining ring between said cam and the wall of said bore provided with spaced chambers having open opposite sides registerable with the relieved portions of said cam respectively, a roller in each of said chambers adapted to extend through the open sides thereof and wedge between said cam surfaces and the wall of said bore for establishing a one-way drive between said members, said rollers having a substantially loose fit in said chambers and being partially movable through the inner open sides thereof into the relieved portions of said cam when said open sides register with said relieved portions during overrunning of said driven member relative to said driving member and resilient means bearing between said retaining ring and said driving member for facilitating the shifting of said rolling contact elements in a predetermined angular direction with respect to said driving member.

6. An overrunning clutch including a driven member having a cylindrical bore, a driving member having a cam disposed in said bore provided with alternate cam surfaces and relieved peripheral portions, a retaining ring between said cam and the wall of said bore provided with spaced chambers having sides registerable with the relieved portions of said cam respectively, a roller in each of said chambers adapted to wedge between said cam surfaces and the wall of said bore for establishing a one-way drive between said members, said rollers having a substantially loose fit in said chambers said retaining ring having a peripheral portion disposed in close proximity to the wall of said bore whereby the latter exerts a drag on said retaining ring for moving said rollers into said relieved peripheral portions, and resilient means bearing between said retaining ring and said driving member for facilitating the shifting of said rolling contact elements in a predetermined angular direction with respect to said driving member.

GEORGE SLIDER.